United States Patent

[11] 3,584,551

| [72] | Inventors | James E. Dierks;<br>Michael S. Montalto; William H. Horton,<br>all of Rochester, N.Y. |
|---|---|---|
| [21] | Appl. No. | 767,345 |
| [22] | Filed | Oct. 14, 1968 |
| [45] | Patented | June 15, 1971 |
| [73] | Assignee | Eastman Kodak Company<br>Rochester, N.Y. |

[54] MECHANISM FOR RETAINING A PERCUSSION-IGNITABLE FLASHLAMP UNIT
5 Claims, 8 Drawing Figs.

[52] U.S. Cl. ...................................... 95/11,
95/11.5, 240/1.3
[51] Int. Cl. .................................... G03b, 15/03
G03b 9/70
[50] Field of Search .......................... 95/11, 11.5;
431/91, 92, 93; 240/1.3

[56] References Cited
UNITED STATES PATENTS

| 590,204 | 9/1897 | Blackmore | 95/11.5 |
| 1,436,715 | 11/1922 | Jackson | 431/92 |
| 2,091,601 | 8/1937 | Leijdens | 431/93 |
| 3,184,584 | 5/1965 | Bundschuh | 240/1.3 |

*Primary Examiner*—Samuel S. Matthews
*Assistant Examiner*—Robert P. Greiner
*Attorneys*—Robert W. Hampton and William C. Dixon, III ABSTRACT: For use in photographic apparatus, such as a camera, having a socket to receive a percussion-ignitable flashlamp unit and an actuating member movable into contact with a received flashlamp unit to effect percussive ignition thereof, a mechanism is provided for releasably retaining the received flashlamp unit in the socket during percussive ignition of the unit.

In the illustrated embodiments, the socket includes a resiliently movable member engageable with a received flashlamp unit to yieldably hold the received unit in the socket, the retaining mechanism being movable into contact with the resiliently movable member to maintain the member in a position of engagement with the received flashlamp unit to thereby retain the unit in the socket.

In the preferred illustrated embodiment, the actuating member is coupled to the retaining mechanism for simultaneous movement therewith in response to operation of the photographic apparatus. In the alternative illustrated embodiment, the actuating member is separately movable into contact with the received unit in response to movement of the retaining mechanism into contact with the resiliently movable member of the socket.

The retaining mechanism of this invention is equally adaptable for retaining, in a respectively suitable socket, a single-lamp flash unit or a multilamp flash unit.

PATENTED JUN 15 1971

JAMES E. DIERKS
MICHAEL S. MONTALTO
WILLIAM H. HORTON

INVENTORS

BY *William C. Dixon, III*

*R.O. Hampton*

ATTORNEYS

PATENTED JUN 15 1971

JAMES E. DIERKS
MICHAEL S. MONTALTO
WILLIAM H. HORTON
INVENTORS

BY *William C. Olson, III*
*R.W. Hampton*
ATTORNEYS 3,584,551

MECHANISM FOR RETAINING A PERCUSSION-IGNITABLE FLASHLAMP UNIT

CROSS-REFERENCES TO RELATED APPLICATIONS

Reference is made to the following copending U.S. Pat. applications:

Ser. No. 765,930, entitled MULTILAMP FLASH UNIT, filed Oct. 8, 1968, in the name of David E. Beach;

Ser. No. 765,931, entitled SOCKET FOR MULTILAMP FLASH UNIT, filed Oct. 8, 1968, in the name of David E. Beach; and Ser. No. 766,739, entitled APPARATUS FOR ACTUATING FIRING OF PERCUSSION-IGNITABLE FLASH LAMPS AND OPERATING MECHANISM THEREFOR, filed Oct. 11, 1968, in the name of William T. Hochreiter.

BACKGROUND OF THE INVENTION

1. Field of the Invention

This invention relates generally to photographic apparatus, and particularly to a mechanism for retaining a percussion-ignitable flashlamp unit received in a socket of a photographic apparatus during percussive ignition of the received unit.

2. Description of the Prior Art

U.S. Pat. No. 2,091,601, issued in 1937 to P. Leijdens, is exemplary of a rather large body of old prior art showing percussion-ignitable flashlamps rigidly secured against accidental movement by an associated actuating or striking member. Such prior art, however, does not teach or suggest a means for securing a percussion-ignitable flashlamp against unintended movement thereof by an associated striking member wherein the securing means is capable of being readily released after percussive ignition of the lamp has been effected.

A number of other patents disclose various types of resilient retaining means for holding an electrically ignitable flashlamp in place during electrical ignition thereof. For example, U.S. Pat. No. 3,015,023, issued in 1961 to D. R. Dayton et al., shows a pair of resilient contacts holding a single-lamp flash unit in its socket; and U.S. Pat. No. 3,319,548, issued in 1967 to F. D. Kottler, shows a U-shaped spring member for resiliently holding the base portion of a multilamp flash unit in its socket. Such patents thus disclose a readily releasable type of retaining means which is adequate for use with an electrically ignitable flashlamp unit, but they fail to teach or suggest a readily releasable type of retaining means which is satisfactory for retaining a percussion-ignitable flashlamp unit against unintended movement thereof that could result from percussive contact with such a unit by a striking member and for releasing the retained unit after percussive ignition by the striking member has been completed.

There has recently been developed a self-contained, percussion-ignitable, flashlamp unit having a lamp envelope enclosing a combustible material and a combustion-supporting gas, with a metal tube extending from the bottom of the lamp envelope and containing a primer charge that is ignitable in response to percussive contact with the tube by a mechanically actuated striking member or hammer built into photographic apparatus adapted to receive such a unit. A flashlamp unit of this kind is described in copending U.S. Pat. application Ser. No. 765,930, entitled MULTILAMP FLASH UNIT, filed Oct. 8, 1968, in the name of David E. Beach. A socket that is suitable for receiving and operatively supporting such a flashlamp unit is described in commonly assigned, copending U.S. Pat. application Ser. No. 765,931, entitled SOCKET FOR MULTILAMP FLASH UNIT, filed Oct. 8, 1968, in the name of David E. Beach. A photographic apparatus and a mechanism therein suitable for percussively igniting such a flashlamp unit supported in such a socket are described in commonly assigned, copending U.S. Pat. application Ser. No. 766,739, entitled APPARATUS FOR ACTUATING FIRING OF PERCUSSION-IGNITABLE FLASH LAMPS AND OPERATING MECHANISM THEREFOR, filed in the name of William T. Hochreiter.

The foregoing copending applications of David E. Beach show socket structures that include a plurality of resiliently movable members engageable with a percussion-ignitable flashlamp unit received in the socket. The resiliently movable members are easily engageable with and disengageable from a flashlamp unit being inserted into or removed from the socket. With socket structures of this type, a more positive means of releasably retaining a received flashlamp unit against accidental movement which might result from percussive contact with the unit by the striking member or hammer in the photographic apparatus is desirable.

Thus there is a need, especially for use with percussion-ignitable flashlamp units and sockets such as those referred to in the aforementioned copending applications, of a positive means for releasably retaining in its socket a received percussion-ignitable flashlamp unit during percussive ignition thereof, preferably a mechanism capable of automatically securing a received unit in its socket immediately before percussive ignition is begun and then releasing the unit for facile removal from the socket after ignition has been completed.

SUMMARY OF THE INVENTION

Accordingly, an object of the present invention was to provide, for photographic apparatus using percussion-ignitable flashlamp units, a means for releasably retaining such a unit received in the apparatus during percussive ignition of the unit. Another object was to provide such a means that would automatically, in response to operation of the photographic apparatus, secure the received flashlamp unit in a socket therefor during percussive ignition of the unit, and then release the unit for facile removal from the socket after ignition has been completed. A further object was to provide such a means that would be particularly suitable for retaining a multilamp flash unit having a plurality of percussion-ignitable flashlamps therein in its socket during percussive ignition of a lamp in such a unit.

To meet these and other objects, the present invention provides, for use in a photographic apparatus having socket means for removably receiving a flash unit of the type including a percussion-ignitable lamp and actuating means movable relative to the socket means for effecting ignition of a percussion-ignitable lamp of a flash unit received by the socket means, a retaining means operatively associated with the actuating means for releasably retaining a received flash unit in the socket means during percussive ignition of a lamp of the received unit. The invention is particularly adaptable for use in retaining a multilamp flash unit of the type including a plurality of percussion-ignitable flashlamps in a socket for receiving such a unit during percussive ignition of one of the included lamps.

In the illustrated embodiments of the invention, the actuating means is movable into contact with a flash unit received by the socket means to effect ignition of a percussion-ignitable lamp of the received unit, and the retaining means is movable into contact with the socket means to retain the received unit in the socket means during ignition of a percussion-ignitable lamp of the received unit, the actuating means being movable into contact with the received flash unit in response to movement of the retaining means into contact with the socket means. In the preferred illustrated embodiment, the actuating means is coupled to the retaining means for simultaneous movement therewith in response to operation of the photographic apparatus. In the alternative illustrated embodiment, the actuating means is separately movable into contact with the received unit upon movement of the retaining means into contact with the socket means.

The invention, and its objects and advantages, will become more apparent in the detailed description of the illustrated embodiments presented below.

BRIEF DESCRIPTION OF THE DRAWINGS

In the detailed description of the illustrated embodiments of the invention presented below, reference is made to the accompanying drawings, in which.

DESCRIPTION OF THE ILLUSTRATED EMBODIMENTS

Because certain parts of photographic and related apparatus are well known, the following description is directed in particular to those elements forming, or cooperating directly with, the present invention, elements that are no specifically shown or described herein being understood to be selectable from those known in the art.

The Preferred Embodiment

Figure 1:
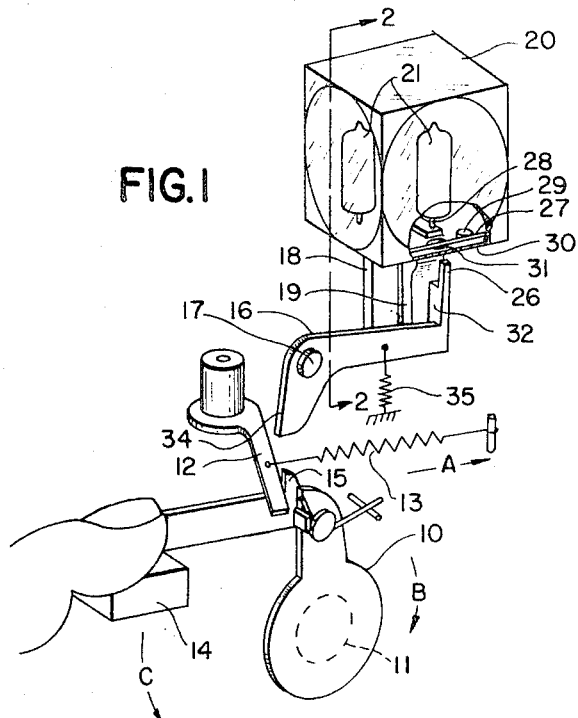
FIG. 1 is a perspective view of the preferred embodiment of the invention, showing a unitary retaining-and-actuating member operatively disposed in relation to pertinent parts of the operating mechanism of a photographic apparatus and a flash-unit-receiving socket having a flash unit received therein, the retaining-and-actuating member being shown in its position before it is moved by the operating mechanism into contact with the socket and the received flash unit, the flash unit being shown partially broken away for clarity of illustration.
Figure 2:
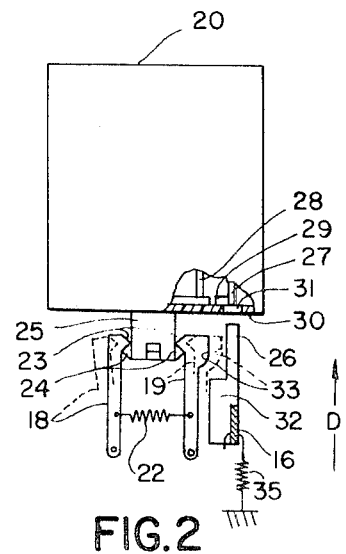
FIG. 2 is a view taken along line 2–2 of FIG. 1, showing a portion of the unitary retaining-and-actuating member in its position before it is moved into contact with a resiliently movable finger of the socket and the received flash unit, the flash unit being shown partially broken away for clarity of illustration.
Figure 3:
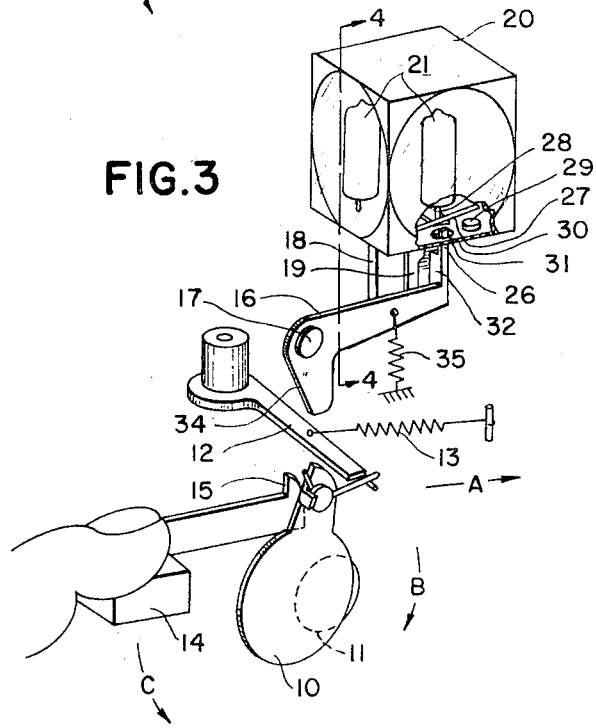
FIG. 3 is a perspective view of the preferred embodiment of the invention, similar to FIG. 1 but showing the unitary retaining-and-actuating member in its position after it has been moved by the operating mechanism into contact with the socket and the received flash unit.

FIGS. 1—4 illustrate the preferred embodiment of the present invention as it could be incorporated a photographic camera. Shown in FIGS. 1 and 3 are a camera shutter 10 operatively disposed in relation to a camera lens opening 11, a shutter-driving member or driver 12 biased for movement by a spring 13 in the direction of arrow A to drive shutter 10 in the direction of arrow B, and a shutter-release member 14 having a lug 15 thereon to hold shutter-driving member 12 in the cocked position shown in FIG. 1. As is well known in the art, movement of shutter-release member 14 in the direction of arrow C disengages lug 15 from shutter-driving member 12, thereby permitting spring 13 to move shutter-driving member 12 in the direction of arrow A to move shutter 10 in the direction of arrow B and thereby momentarily uncover lens opening 11 for a photographic exposure of film in the camera.

Shown operatively disposed in relation to shutter-driving member member 12 is a Z-shaped member 16 pivotally mounted about a pin 17 attached to the camera frame (not shown). Z-shapedmember 16 is, in turn, operatively disposed in relation to members 18 and 19 of a socket in the camera for receiving a multilamp flash unit 20 of the type including a plurality of percussion-ignitable flashlamps 21.

As may be seen more clearly in FIG. 2, members 18 and 19 of the camera socket take the form of pivotally mounted fingers spaced from each other as shown and made resiliently movable toward and away from each other by a spring 22 interconnecting the two members. At the movable end portion of each of fingers 18 and 19 is a cam surface 23 designed to engage a suitably shaped lug 24 on the mounting stem 25 of received flash unit 20, as shown. Mounting stem 25, having lugs 24 peripherally spaced therearound as shown, is similar to the mounting stem commonly used on electrically ignitable multilamp flash units. The biasing force of spring 22 is normally sufficient to retain a flash-unit mounting stem between fingers 18 and 19 when the lamps of a received flash unit are ignited electrically. When the lamps of a received flash unit are ignited percussively, however, the resilient nature of the engagement of fingers 18 and 19 with lugs 24 is such as to permit fingers 18 and 19 to pivot away from each other, in opposition to the biasing influence of spring 22, and thereby accidentally release the received flash unit when a percussion-igniting force is exerted upon the unit in the direction of arrow D. The mechanism of the present invention is directed to the problem of preventing such unintended ejection of a received flash unit when the unit is percussively contacted by an actuating o striking member in the camera.

In the preferred embodiment illustrated in FIGS. 1—4, the actuating member which percussively contacts received flash unit 20 comprises the upwardly extending portion 26 of Z-shaped member 16. As can be seen in FIGS. 1 and 3, counterclockwise movement of member 16 effects generally upward movement of actuating portion 26 thereof. Such upward movement of actuating portion 26 causes portion 26 to contact received flash unit 20 to effect percussive ignition of a lamp 21 therein.

The flash unit illustrated in FIGS. 1—4 is of the type that includes a movable striking member 27 adjacent to but spaced from each lamp 21 of the unit, striking member 27 being biased for rapid movement into percussive contact with the ignition tube 28 of the adjacent lamp 21 when striking member 27 is disengaged from a pin 29 secured to the flash-unit base 30 holding striking member 27 in a cocked position, shown in FIGS. 1 and 2. Suitably disposed in base 30 beneath each striking member 27 is an opening 31 through which actuating portion 26 of member 16 can move upwardly into contact with cocked striking member 27 to disengage striking member 27 from pin 29 and thereby permit member 27 to move into percussive contact with ignition tube 28 of adjacent flashlamp 21 to ignite the contacted lamp. Thus the actuating means shown in FIGS. 1—4 is operative, when moved into contact with the received flash unit, to effect percussive ignition of a lamp in the contacted unit.

Figure 4:
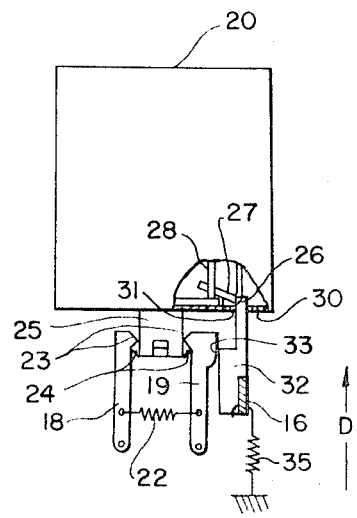
FIG. 4 is a view taken along line 4–4 of FIG. 3, similar to FIG. 2 but showing the portion of the unitary retaining-and-actuating member in its position after it has been moved into contact with the resiliently movable finger of the socket and the received flash unit.

FIGS. 1 and 2 illustrate the position of actuating portion 26 of member 16 before percussive ignition is initiated by movement of member 16. Accordingly, the upper end of actuating portion 26 is shown spaced from the overlying opening 31 in received flash unit 20. FIGS. 3 and 4, on the other hand, show actuating potion 26 of member 16 in its position of contact with striking member 27 of received flash unit 20.

As can be seen most readily in FIGS. 2 and 4 member 16 has a portion 32 thereof beneath actuating portion 26 that is wider than portion 26 and hence closer to the adjacent one of resiliently movable fingers 18 and 19 of the socket. As will be noted from a comparison of FIGS. 2 and 4, movement of member 16 from its position shown in FIG. 2 to its position shown in FIG. 4 causes portion 32 to move into contact with the right-hand surface 33 of finger 19, thereby preventing movement of finger 19 to the right, i.e., in a direction away from lug 24 of flash unit 20 with which finger 19 has been engaged. FIG. 4 thus shows a portion of member 16 as it is both actuating percussive ignition of a lamp 21 in received flash unit 20 and securing received unit 20 against accidental ejection from the socket by the impact of actuating portion 26 upon unit 20. It should be noted that portion 32, hereinafter referred to as the retaining potion of member 16, is so dimensioned, in relation to actuating portion 26, as to effect positive retention of received unit 20 in the socket when actuating portion 26 contacts unit 20 to percussively ignite a lamp 21 in the unit. In accordance with the preferred embodiment as illustrated in FIGS. 1—4, the actuating means 26 and the retaining means 32 are coupled to each other for simultaneous movement to their respective positions of contact with the received unit 20 and the movable finger 19 of the socket.

As seen in FIGS. 1 and 3, the portion 34 of Z-shaped member 16 that is closest to shutter-driving member 12 is disposed for movement by shutter-driving member 12 during movement of member 12 in the direction of arrow A. Such direct movement of a percussion-ignition-actuating member by shutter-driving movement of a shutter-driving member in a photographic apparatus is described more fully in commonly assigned, copending U.S. Pat. application Ser. No. 767,100, filed Oct. 14, 1968 in the name of Chester W. Michatek.

It can thus be seen that downward movement of shutter-release member 14 initiates not only the opening of camera shutter 10 but also movement of Z-shaped member 16 resulting in positive retention of received flash unit 20 in its socket and percussive ignition of a lamp 21 in retained unit 20. FIG. 1 shows the positions of the illustrated members prior to depression of shutter-release member 14 by the camera operator. FIG. 3 shows the positions of the same members after depression of shutter-release member 14 by the camera operator. As will be noted, a spring 35 is shown attached at one end to member 16 to return member 16, and hence the actuating and retaining portions thereof, to its original, disengaged position after percussive ignition of the contacted flashlamp 21 has been completed. The invention as illustrated in FIGS. 1—4 therefore achieves, automatically, both the positive retention of a received flash unit in its socket during percussive ignition of a lamp in the received unit and release of such retention after percussive ignition has been completed.

An Alternative Embodiment

FIGS. 5—8 of the drawings illustrate an alternative embodiment of the present invention wherein the camera shutter, the lens opening, the shutter-driving member, the driving-member spring, and the shutter-release member are all the same as those illustrated in FIGS. 1—4 and described with reference to the preferred embodiment, such like members being designated by like reference numerals primed.

Figure 5:
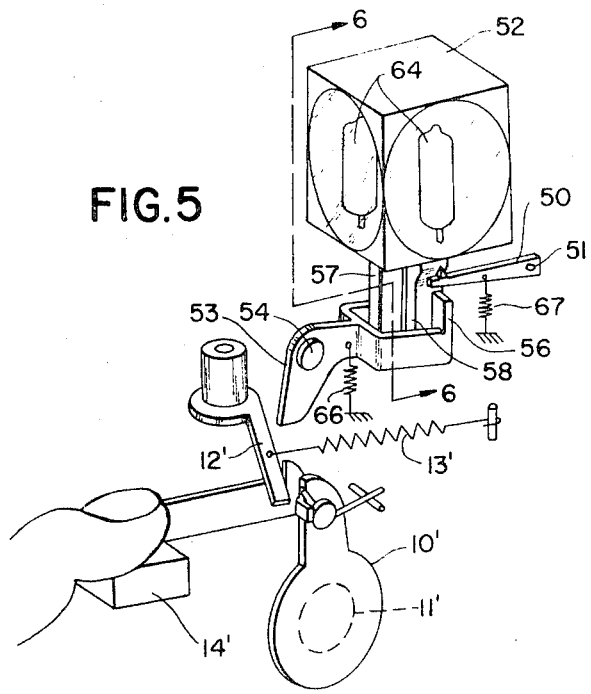
FIG. 5 is a perspective view of an alternative embodiment of the invention, showing separately movable retaining-and-actuating members operatively disposed in relation to pertinent parts of the operating mechanism of a photographic apparatus and a flash-unit-receiving socket having a flash unit received therein, the retaining-and-actuating members being shown in their respective positions before they are moved by the operating mechanism into contact with the socket and the received flash unit.
Figure 6:
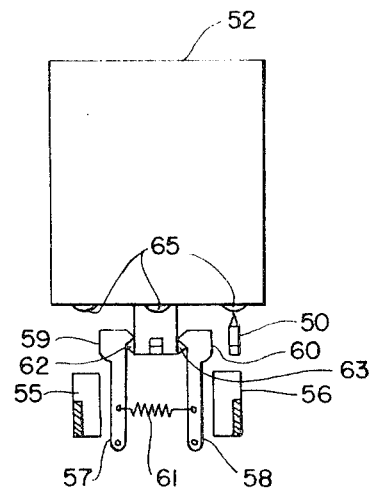
FIG. 6 is a view taken along line 6–6 of FIG. 5, showing portions of the retaining member in their positions before they are moved into contact with a pair of resiliently movable fingers of the socket and the actuating member in its position before it is moved into contact with the received flash unit.
Figure 7:
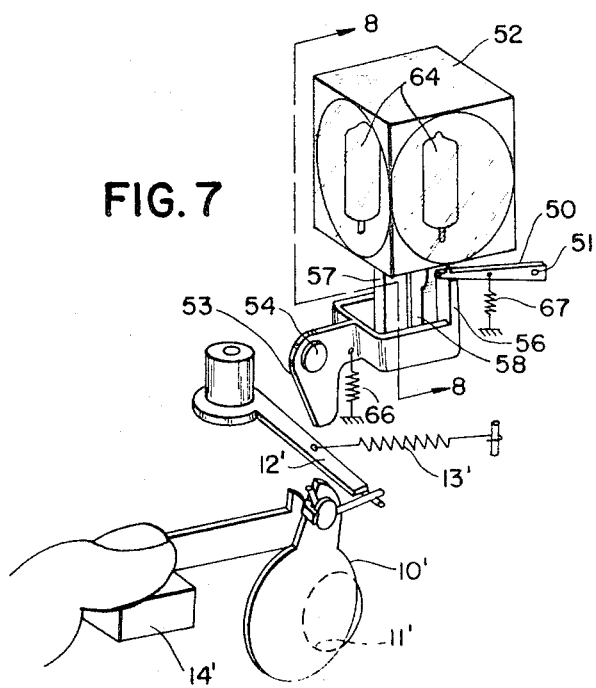
FIG. 7 is a perspective view of the alternative embodiment of the invention, similar to FIG. 5 but showing the retaining-and-actuating members in their respective positions after they have been moved by the operating mechanism into contact with the socket and the received flash unit.

Whereas the actuating means 26 and the retaining means 32 of the embodiment illustrated in FIGS. 1—4 are coupled to move together, the actuating means and retaining means in the alternative embodiment illustrated in FIGS. 5—8 are separately movable members. As shown in FIGS. 5 and 7, the actuating means in this embodiment comprises an actuating member 50 pivotally mounted as at 51 movement into contact with a received flash unit 52, while the retaining means in this embodiment comprises a separately movable bifurcated member 53 pivotally mounted as at 54. The two upwardly extending arm 55 and 56 of the bifurcated end of member 53 straddle a pair of resiliently movable fingers 57 and 58 of the socket in such a manner as to contact the outer surfaces 59 and 60 of fingers 57 and 58 when arms 55 and 56 are moved upwardly toward received flash unit 52.

Figure 8:
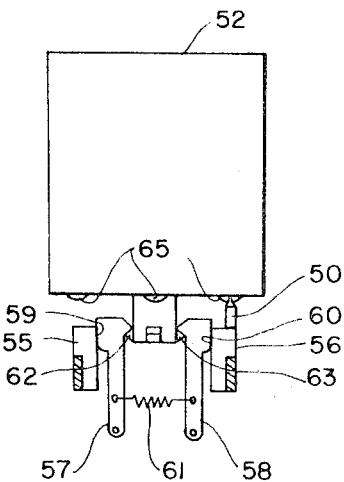
FIG. 8 is a view taken along line 8–8 of FIG. 7, similar to FIG. 6 but showing the potions of the retaining member in their positions after they have been moved into contact with the pair of resiliently movable fingers of the socket and the actuating member in its position after it has been moved into contact with the received flash unit.

As can be seen most readily by a comparison of FIGS. 5 and 6 with FIGS. 7 and 8, retaining member 53, when moved in a counterclockwise direction, achieves two things. First, arms 55 and 56 of the bifurcated end of member 53 are moved upwardly into contact with surfaces 59 and 60 of fingers 57 and 58 of the socket to prevent fingers 57 and 58 from pivoting outwardly, against the inwardly biasing influence of spring 61, and thereby becoming disengaged from a pair of lugs 62 and 63 on received flash unit 52 with which fingers 57 and 58 have been engaged, so as to secure flash unit 52 in the socket against accidental ejection during percussive ignition of a lamp 64 in the unit. Second, as arm 56 of the bifurcated end of member 53 is moved upwardly, it engages actuating member 50 and moves member 50 upwardly into contact with received flash unit 52 to percussively ignite a lamp 64 in the unit. It can thus be seen that percussive ignition of a lamp 64 in received flash unit 52 is effected by movement of actuating member 50 into contact with unit 52, such movement of actuating member 50 being in response to movement of retaining member 53 into contact with movable fingers 57 and 58 of the socket.

As may be noted, the flash unit illustrated in FIGS. 5—8 is of the type having the lower end 65 of the ignition tube of each lamp 64 protruding downwardly through a suitable opening in the flash-unit base so as to be percussively contactable by actuating member 50 directly. In this embodiment, then, the actuating means itself is movable into percussive contact with a lamp of a received unit to ignite the contacted lamp.

As in the preferred embodiment illustrated in FIGS. 1—4, the retaining means of this embodiment is part of a Z-shaped member that is pivotally mounted on the camera frame. In operation, Z-shaped member 53 of the alternative embodiment is moved in a counterclockwise direction in response to shutter-driving movement of shutter-driving member 12' just as Z-shaped member 16 of the preferred embodiment is moved by shutter-driving member 12.

It can thus be seen that downward movement of shutter-release member 14' initiates not only the opening of camera shutter 10' but also movement of Z-shaped member 53, and hence movement of the retaining means 55 and 56 and the actuating means 50, resulting in positive retention of received flash unit 52 in its socket and percussive ignition of a lamp 64 in retained unit 52. To return members 53 and 50, and hence the retaining-and-actuating means provided thereby, to their original, disengaged positions after percussive ignition of the contacted lamp has been completed, springs 66 and 67 are provided, as shown in FIGS. 5 and 7. In this embodiment, therefore, positive retention of the received flash unit in its socket is effected automatically immediately before percussive ignition of a lamp in the received unit is begun, and release of such positive retention is effected automatically immediately after percussive ignition of the flashlamp has been completed.

The mechanism of the present invention thus provides a ready means of effecting positive retention of a received flashlamp unit in its socket during the process of percussively igniting a lamp in the received unit and thereafter effecting the release of such positive retention to permit facile removal of the received unit from its socket, such retention and release being achieved automatically in response to normal operation of the photographic apparatus. The invention thus obviates the use of any separate flashlamp clamping means and/or ejecting means which may otherwise be necessary in such apparatus, thereby reducing the cost and simplifying the operation of the apparatus involved.

The invention has been described in detail with particular reference to the illustrated preferred and alternative embodiments thereof, but it will be understood that variations and modifications can be effected within the spirit and scope of the invention.

We claim:

1. Photographic apparatus for use with a multilamp flash unit of the type having a plurality of flashlamps each actuatable by application of a mechanical force to the unit, said apparatus comprising:

a socket for receiving such a unit, said socket including at least one retaining member resiliently biased toward a retaining position for holding said unit and movable against said resilient bias to a releasing position to allow insertion and removal of said unit from said socket;

means for applying a mechanical actuating force to said unit; and means for locking said retaining member in its retaining position during application of said mechanical force.

2. The apparatus according to claim 1 wherein said locking means is actuable in response to actuation of said force applying means.

3. The apparatus according to claim 1 wherein said force applying means includes a movable member for engaging said lamp unit and said locking means is integrally formed with said movable member and moves into locking engagement with said retaining member as said movable member moves into engagement with said unit.

4. Photographic apparatus for use with a multilamp flash unit of the type having a plurality of flashlamps actuable by striking and a releasably held, preenergized striker for each lamp, said apparatus comprising:

a socket for receiving such a unit, said socket including at least one retaining surface movable between an engaging position for holding said unit and a releasing position for allowing insertion and removal of said unit:

an actuating member movable into releasing engagement with a preenergized striker in said unit;

a locking member movable from a first position out of engagement with said retaining member to a second position in engagement with said retaining member to lock said retaining member in its retaining position; and means for moving said locking member into locking engagement with said retaining member during movement of said actuating member into actuating engagement with said preenergized striker.

5. Photographic apparatus for use with a multilamp flash unit of the type having a plurality of flashlamps actuable by striking and a releasably held, preenergized striker for each lamp, said apparatus comprising:

means for releasably receiving such a flash unit:

an actuating member movable into releasing engagement with said preenergized striker; and a locking member connected to said actuating member for movement therewith into a position locking said flash unit on said apparatus during movement of said actuating member into said releasing engagement with said preenergized striker.